(12) United States Patent
Bennett et al.

(10) Patent No.: US 8,788,322 B2
(45) Date of Patent: Jul. 22, 2014

(54) INTEGRATION OF WIC ITEMS AND TRANSACTIONS INTO PERSONAL SHOPPING DEVICES

(75) Inventors: David Lawrence Bennett, Raleigh, NC (US); Robert James Demick, Raleigh, NC (US); David L. Johnson, Clayton, NC (US); Thomas J. Prorock, Raleigh, NC (US); Raymond Lee Waddell, Jr., Raleigh, NC (US); Long-Kim Vo Yates, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 1089 days.

(21) Appl. No.: 12/136,585

(22) Filed: Jun. 10, 2008

(65) Prior Publication Data

US 2008/0243621 A1 Oct. 2, 2008

Related U.S. Application Data

(63) Continuation of application No. 11/026,781, filed on Dec. 30, 2004.

(51) Int. Cl.
  *G06Q 30/00* (2012.01)
(52) U.S. Cl.
  USPC .......................................................... 705/14
(58) Field of Classification Search
  USPC .......................................................... 705/14
  See application file for complete search history.

(56) References Cited

U.S. PATENT DOCUMENTS

| | | | |
|---|---|---|---|
| 5,642,279 A | 6/1997 | Bloomberg et al. | |
| 5,821,513 A * | 10/1998 | O'Hagan et al. | 235/383 |
| 5,854,475 A | 12/1998 | Goodwin, III | |
| 6,129,274 A | 10/2000 | Suzuki | |
| 6,434,530 B1 * | 8/2002 | Sloane et al. | 705/26.62 |
| 7,228,287 B1 * | 6/2007 | Samson et al. | 705/14.13 |
| 2002/0111873 A1 | 8/2002 | Ehrlich et al. | |
| 2002/0120539 A1 | 8/2002 | Price | |
| 2004/0064332 A1 | 4/2004 | Zou et al. | |
| 2004/0133474 A1 | 7/2004 | Tami et al. | |
| 2005/0021417 A1 | 1/2005 | Kassan | |
| 2005/0177463 A1 * | 8/2005 | Crutchfield et al. | 705/27 |
| 2006/0074784 A1 * | 4/2006 | Brown | 705/35 |
| 2006/0089918 A1 | 4/2006 | Avanzi et al. | |
| 2011/0022458 A1 * | 1/2011 | Kassan | 705/14.39 |

OTHER PUBLICATIONS

Brown, Alvin L., Non-final Rejection, Mar. 14, 2008, U.S. Appl. No. 11/026,781.
Brown, Alvin L., Final Rejection, Sep. 11, 2008, U.S. Appl. No. 11/026,781.
Brown, Alvin L., Examiner's Answer, May 22, 2009, U.S. Appl. No. 11/026,781.

* cited by examiner

*Primary Examiner* — Alvin L Brown
(74) *Attorney, Agent, or Firm* — Yudell Isidore PLLC

(57) ABSTRACT

A method, system and computer program product for providing access to government benefits is disclosed. The method comprises positioning a short-range transmitter in a predetermined product area in a store, and storing one or more marketing messages in the short-range transmitter, wherein the one or more marketing messages are associated with one or more specific products located in the predetermined product area. The one or more marketing messages are transmitted to a wireless computer, and a user is identified as a participant in a government benefits scheme. Available under a subsidy program are communicated to a user and upon purchase of an item, an analysis of benefits available under a subsidy program is provided.

18 Claims, 13 Drawing Sheets

ALL ITEMS INVENTORY VIEW — 400

| Selected Item | Category and Subcategory | Unit of Measure, Quantity & Base Price | WIC Cost | OOP Cost |
|---|---|---|---|---|
| 1 Gallon of A Milk | 01-002 | Gallon - 1 - 6.58 | 6.58 ▲ | ▼ 6.16 |
| 2 pounds of cheese | 02-000 | Pound - 2 - 3.58 | 8.16 ▲ | |
| 2 cans of orange juice | 04-002 | Cans - 2 - 4.58 | | |
| 6 pack of beer | NOT ELIGIBLE | Cans - 6 - 4.58 | | 4.58 |
| | | Totals: | 14.74 | 10.74 |

CURRENT AVAILABLE BENEFITS VIEW

| Selected Item | Category, Subcategory and Expiration | Unit of Measure Quantity and Cost |
|---|---|---|
| A brand (1 Gallon of) Milk | 01-002 - 11/11/11 | Gallon - 1 - 6.58  ⓘ —416 |
| B brand (1 pound of) bread | 02-000 - 11/12/12 | Pound - 1 - 3.58 |
| Z brand (1 can of) orange juice | 04-002 - 11/14/13 | Can - 1 - 4.58 |
| X brand (1 pound of) ham | 06-003 - 11/11/11 | Can - 1 - 4.58 |

| WIC ITEMS INVENTORY VIEW | | |
|---|---|---|
| Selected Item | Category, Subcategory and Expiration | Unit of Measure Quantity and Cost |
| 1 Gallon of A Milk | 01-002 | Gallon - 1 - 6.58  [416] |
| 2 pounds of cheese | 02-000 | Pound - 2 - 3.58 |
| 2 cans of orange juice | 04-002 | Cans - 2 - 4.58 |
| | | |

*Fig. 7*

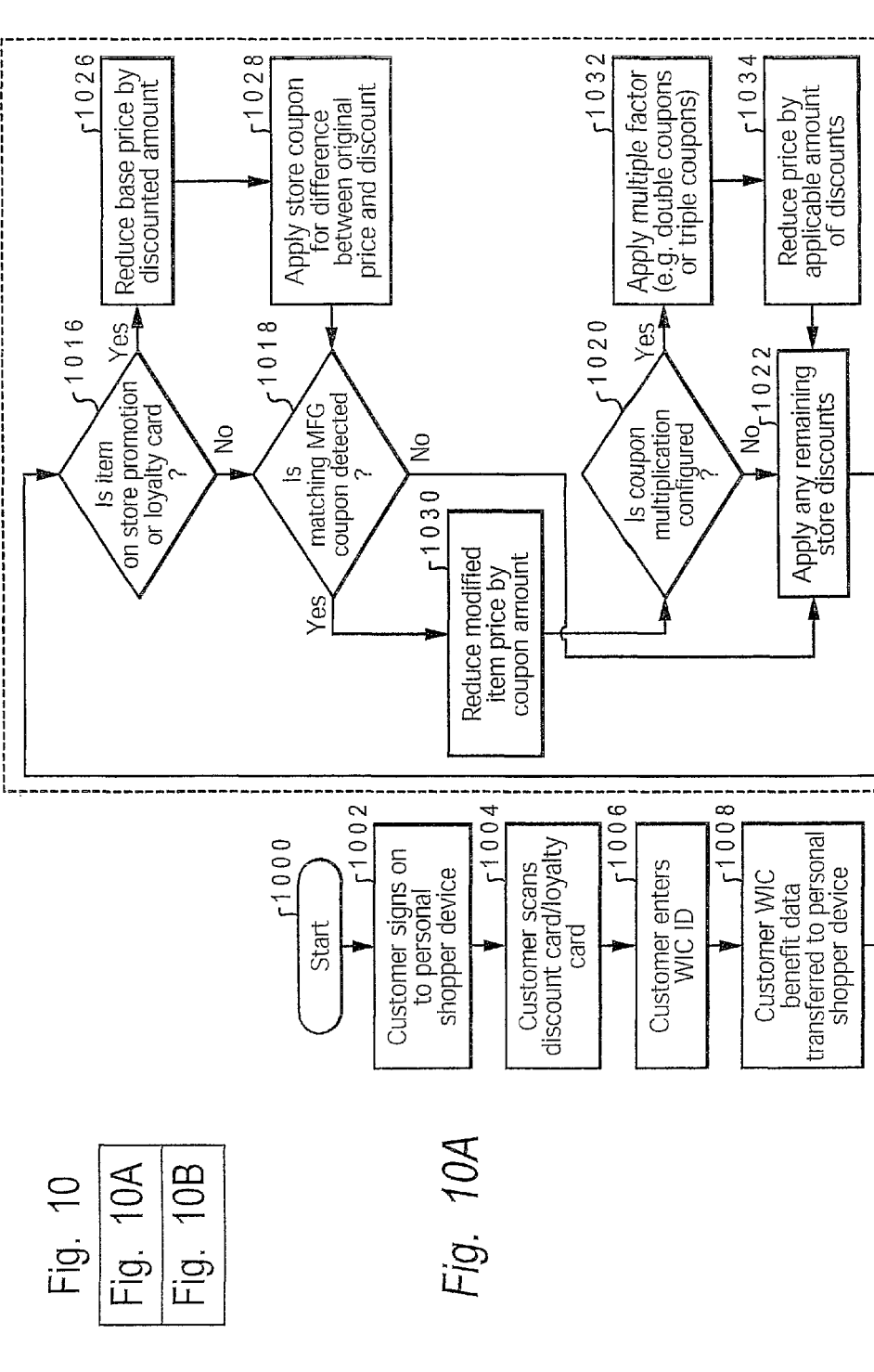

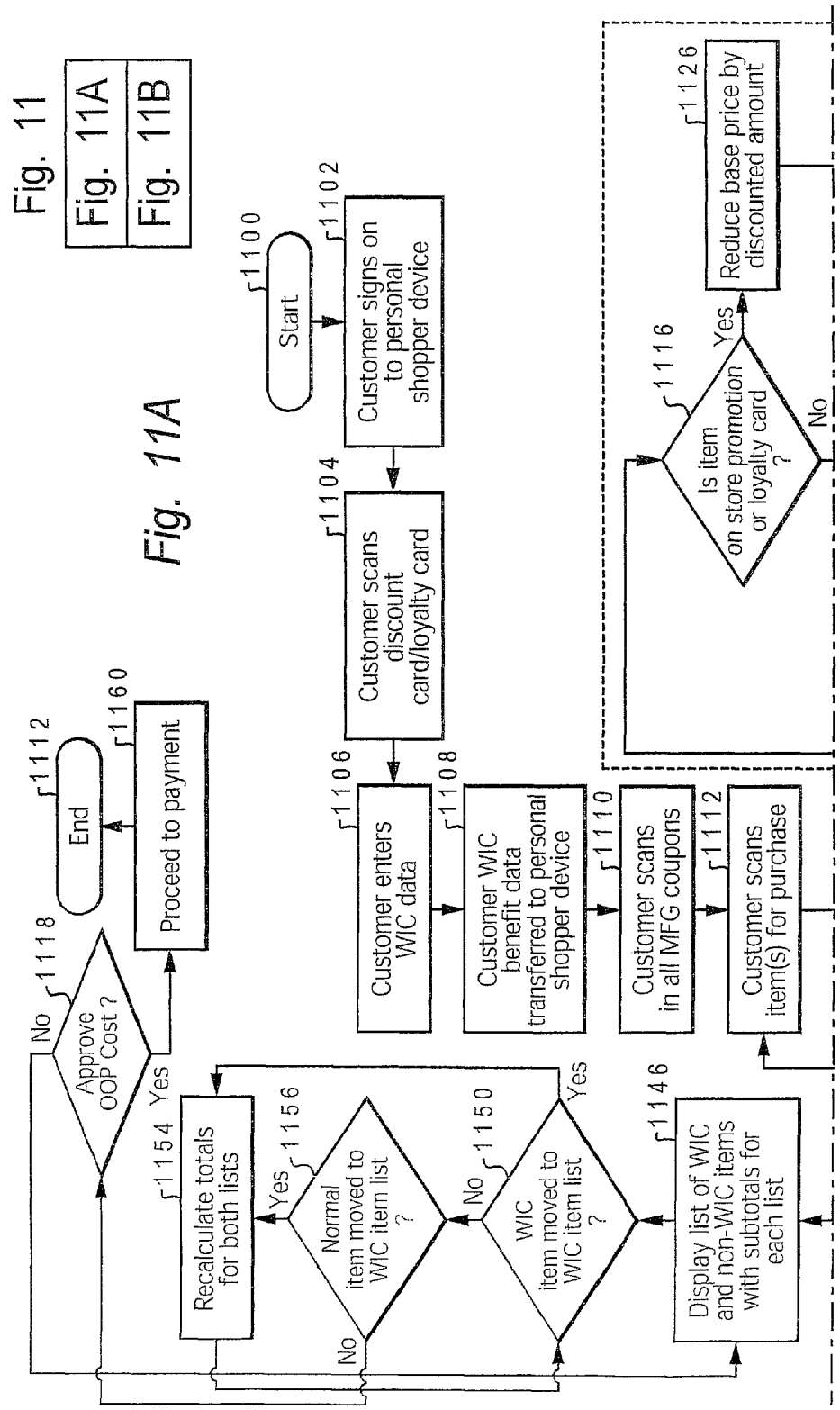

INTEGRATION OF WIC ITEMS AND TRANSACTIONS INTO PERSONAL SHOPPING DEVICES

PRIORITY CLAIM

The present application is a continuation of U.S. patent application Ser. No. 11/026,781, filed on Dec. 30, 2004, entitled "Integration of WIC Items and Transactions into Personal Shopping Devices". Applicants claim benefit of priority under 35 U.S.C. §120 to U.S. patent application Ser. No. 11/026,781, which is incorporated by reference herein in its entirety and for all purposes.

BACKGROUND OF THE INVENTION

1. Technical Field

The present invention relates in general to the field of computers, and in particular to wireless computers receiving signals from short-range transmitting devices. Still more particularly, the present invention relates to a method and system for providing access to government benefits by locating, detecting, prompting purchase of, and monitoring eligible Women, Infants, and Children ("WIC") items in a store.

2. Description of the Related Art

The United States Department of Agriculture administers a special supplemental nutrition program for women, infants and children, commonly referred to as "WIC". The WIC program targets the low-income, nutritionally at risk population. In particular, the WIC program may assist pregnant women, infants up to their first birthday and children up to their fifth birthday. The WIC program provides many benefits to such women, infants and children, such as supplemental nutritious foods, nutrition education and counseling at WIC clinics and screening and referrals to other health, welfare and social services. The WIC program currently serves approximately 3.82 million children, 1.95 million infants and 1.86 million women at a cost of approximately 4.7 billion dollars.

Currently, WIC participants may receive checks or vouchers to purchase specific foods each month that are designed to supplement their diets. The foods provided are high in one or more of the following nutrients: protein, calcium, iron and vitamins A and C. These are the nutrients frequently lacking in the diets of the program's target population. Different food packages are provided for different categories of participants.

The WIC foods in a food package that are available to be purchased by a particular WIC participant may not be easily identified in a grocery store. Some of these WIC items may be identified, such as by a sticker with the label "WIC authorized". However, these stickers may not be self-evident. For example, the WIC eligible items, along with their WIC eligible labels, may be stocked in high or low positions on a shelf and hence may not be easily identified. Furthermore, not all of the WIC eligible items may be marked.

After the WIC participant placed the eligible WIC items that could be located in the grocery cart, the WIC participant may hand the cashier a paper voucher to purchase the items. There are various problems with using paper vouchers to purchase WIC items. For example, the cashier may assume incorrectly that the items purchased with the voucher were all eligible WIC items. Furthermore, using the paper voucher to purchase WIC items may result in long waits by retailers for reimbursement. Furthermore, the WIC participant may be uncomfortable to hand the cashier a WIC paper voucher due to the stigma associated with receiving food for free from a government program. Finally, users have traditionally experienced confusion in tracking the most efficient use of their benefits from a price-benefit perspective. Additionally, conventional solutions lead to voided transactions (e.g. for lack of funds or benefits), because the user has limited ability to predict total real prices before a transaction is complete.

Consequently, the U.S. Department of Agriculture in 2002 promulgated a program, referred to as the Electronic Benefits Transfer ("EBT") program, designed to replace the time-consuming and error-prone paper voucher system that was costly to administer, often uncomfortable for participants to use, and could result in long waits by retailers for reimbursement. Pilot programs for implementing the EBT program are now occurring across the country.

However, there are no currently available mobile shopping user interface systems that implement the WIC-EBT standard in a manner that is adequate for assisting the WIC participant in locating their WIC eligible items in the store and completing the purchase most beneficial to the participant.

This is especially true at the actual time of the purchase, such as in a grocery store or similar retail establishment. The prior art is inadequate to target the WIC-buying audience and facilitate their transactions. What is needed is a system, method and computer program product for providing access to government benefits by locating, detecting, prompting purchase of, and monitoring eligible Women, Infants, and Children ("WIC") items in a store.

SUMMARY OF THE INVENTION

A method, system and computer program product for providing access to government benefits is disclosed. The method comprises positioning a short-range transmitter in a predetermined product area in a store, and storing one or more marketing messages in the short-range transmitter, wherein the one or more marketing messages are associated with one or more specific products located in the predetermined product area. The one or more marketing messages are transmitted to a wireless computer, and a user is identified as a participant in a government benefits scheme. Benefits available under a subsidy program are communicated to a user and upon purchase of an item, an analysis of benefits available under a subsidy program is provided.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

FIG. 4 illustrates a graphical user interface that correlates items that have been previously selected by a shopper with associated costs and available government benefits;

FIG. 6 illustrates an exemplary Graphical User Interface (GUI) on the wireless device offering an inventory of available benefits to the shopper;

FIG. 7 depicts an exemplary Graphical User Interface (GUI) on the wireless device for tracking an inventory of benefits currently being used by the shopper;

DETAILED DESCRIPTION OF THE PREFERRED EMBODIMENT

Although the present invention is described with reference to the WIC program, as described above, it is noted that the principles of the present invention may be applied to any government benefit service program or other nongovernmental benefit programs. It is further noted that embodiments applying the principles of the present invention to other government benefit service programs and nongovernmental benefit programs would fall within the scope of the present invention. While the present invention is described with respect to a portable personal shopping device, one skilled in the art will realize that the invention may also be practiced with respect to fixed point of sale equipment without departing from the spirit and scope of the invention.

Figure 1:
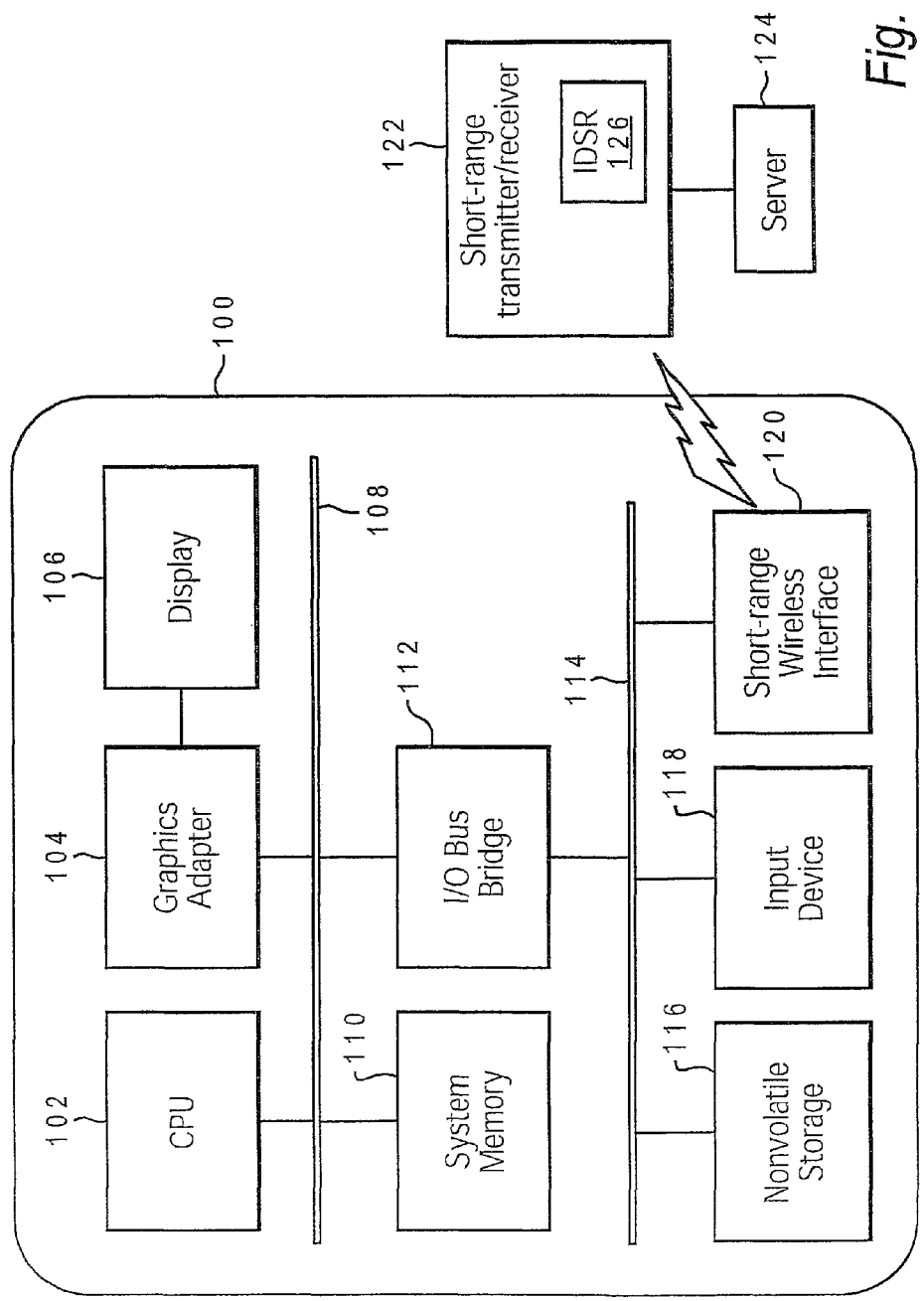
FIG. 1 illustrates an exemplary computer system in which the present invention can be implemented, either as a wireless device for receiving a marketing message, a transmitter/receiver for communicating with the wireless device, and/or as a server that exchanges data with the wireless device via the transmitter/receiver.

With reference now to FIG. 1, there is depicted a block diagram of an exemplary data processing system in which a preferred embodiment of the present invention may be implemented. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, as well as a bar code or similar reader or a card reader or other similar device, is connected to I/O bus 114. Data processing system 100 will perform the method of the present invention using software, stored in memory system 110 and executed on CPU 102. The construction and use of software structures is well understood by those skilled in the relevant arts.

Data processing system 100 also includes a wireless interface 120. Wireless interface 120 is an interface that permits data processing system 100 to wirelessly communicate, preferably via a line-of-sight carrier signal such as a low-power infrared (IR) wave, with another data processing system, such as a short-range transmitter/receiver system 122, which also communicates with a server 124. Note that in a preferred embodiment, all communication is tuned down to a low-power level IR, such that there is only line-of-sight communication, such that no wireless communication occurs from reflected or other "bleed over" signals.

Short-range transmitter/receiver 122 may also include an IDentification Signal Receiver (IDSR) 126. IDSR 126 is a logic (hardware and/or software) that receives and processes an identification signal from a wireless computer such as a Personal Shopping Device (PSD).

In a preferred embodiment, the features shown for data processing system 100 are used by the PSD, while the short-range transmitter/receiver 122 uses all features shown for data processing system 100 except for the graphics adapter 104 and display 106, and the server 124 has all features shown for data processing system 100 except for the short-range wireless interface, since server 124 and short-range transmitter/receiver 122 preferably are able to communicate across long distances.

The exemplary embodiment shown in FIG. 1 is provided solely for the purposes of explaining the invention. Those skilled in the art will recognize that numerous variations are possible, both in form and function. For instance, data processing system 100 might also include a compact disk read-only memory (CD-ROM) or digital versatile disk (DVD) drive, a sound card and audio speakers, and numerous other optional components. All such variations are believed to be within the spirit and scope of the present invention.

Figure 2:
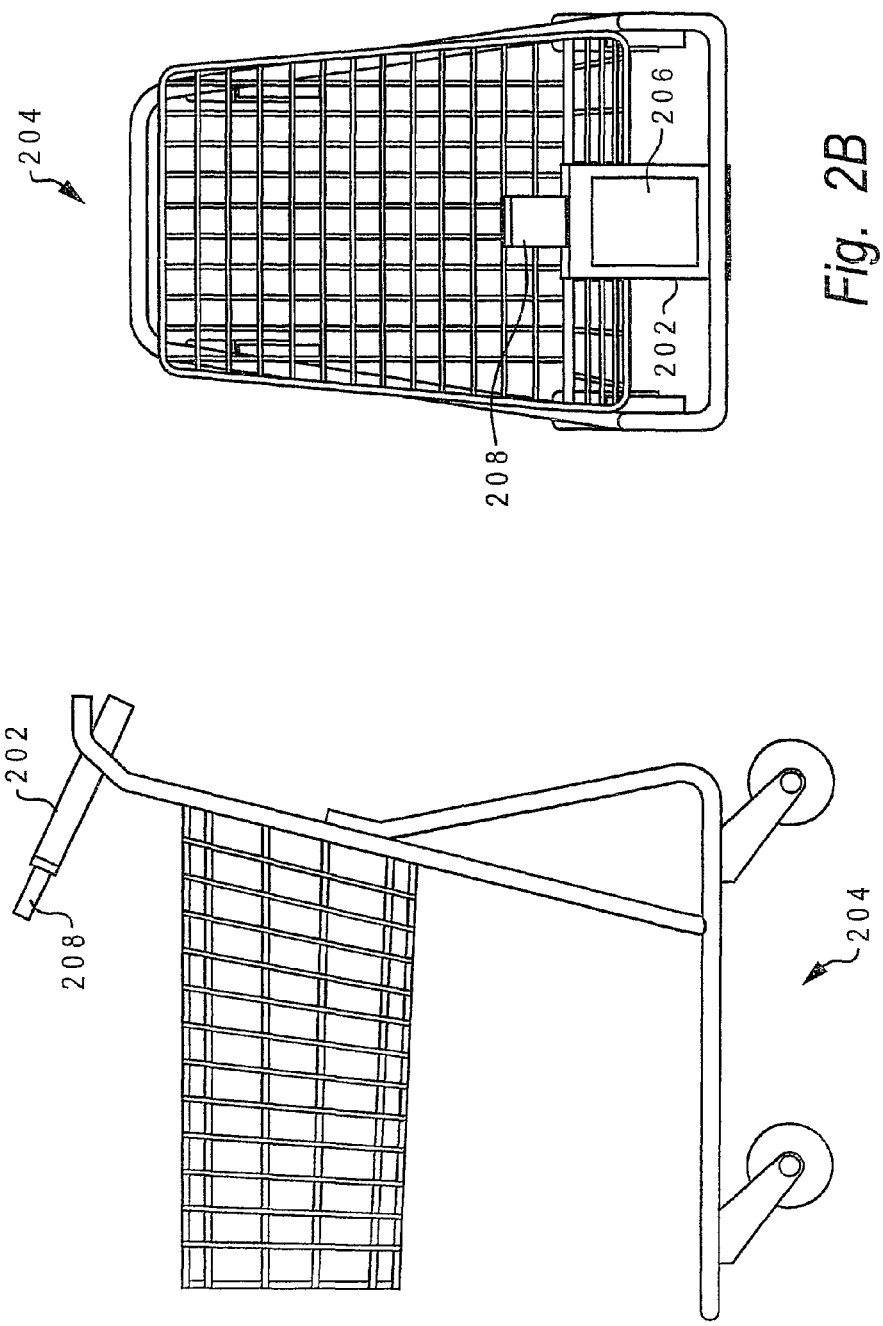
FIGS. 2A and 2B depict an exemplary environment in which the wireless device is mounted to a shopping cart in a store.

Referring now to FIGS. 2A-2B, an exemplary use of data processing system 100 is shown. Data processing system 100 is depicted as a Personal Shopping Device (PSD) 202, which is attached to a shopping cart 204, preferably in a manner that is semi-fixed (i.e., requiring tools to remove PSD 202 from shopping cart 204, in order to prevent the theft of PSD 202). As seen in the top view of FIG. 2B, PSD 202 has an active viewing screen 206, which displays a Graphical User Interface (GUI) for displaying data, as well as for receiving inputs (preferably via a touch-screen capability) into PSD 202.

An exemplary use of PSD 202 may be in a retail establishment. As a shopper places items into shopping cart 204, the shopper scans the product using a bar code reader/magnetic card/smartcard reader module 208, which reads a Universal Product Code (UPC) bar code from a product selected by the shopper and records the product in PSD 202. Bar code reader/magnetic card/smartcard reader module 208 is also capable of reading a magnetic identification card for the purpose of identifying a user as a recipient of government benefits. In addition to bar code, magnetic cards, and smartcards, some embodiments of bar code reader/magnetic card/smartcard reader module 208 may be configured to read other forms of non-volatile memory devices, such as compact flash, memory keys, or memory sticks. The PSD 202 stores all items that have been scanned and placed in the shopping cart 204 into a list. When the customer checks out, the checker simply downloads the list (with prices) to conclude a shopping transaction.

Figure 3:
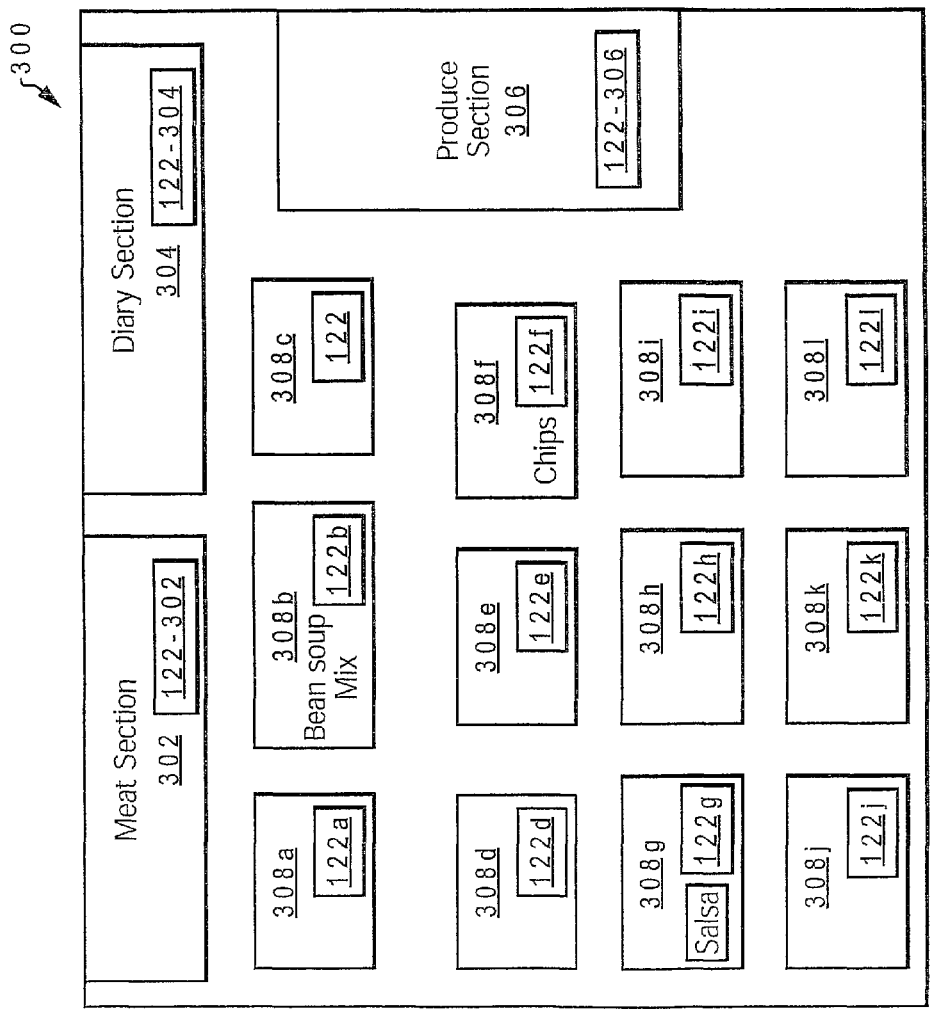
FIG. 3 is an exemplary store plan layout in which the present invention may be implemented.

Referring now to FIG. 3, there is illustrated an exemplary environment in which the present invention may be utilized. Store plan 300 depicts an arrangement of a retail store having multiple predetermined product areas 308. Within each product area 308 is a short-range transmitter/receiver 122. Each short-range transmitter/receiver 122 preferably uses a low-power infrared (IR) carrier signal, such that communication with a short-range transmitter/receiver 122 is only available within the associated pre-determined product area 308 via line-of-sight, and not via reflected or other bleed-over signals. For exemplary purposes, note that store plan 300 may include a meat section 302, a dairy section 304, and a produce section 306, each section also being a pre-determined product area having a short-range transmitter/receiver 122. Each short-range transceiver 122 communicates with server 124 to retrieve shopping information and government benefits information in the form of marketing messages related to products available both throughout the store and in the vicinity of the short-range transceiver.

While the invention is explained with respect to an infrastructure involving short-range transmitter devices as depicted in FIG. 3, one skilled in the art will quickly realize that the invention is capable of being practiced in different communication environments, some as simple as being based on the scanning of an item, without departing from the scope of the invention.

Turning now to FIG. 4, a Graphical User Interface (GUI) that correlates items that have been previously selected by a shopper with associated costs and available government benefits is illustrated. FIG. 4 illustrates an all items inventory view 400 of items purchased by a user of the personal shopping device 202 without regard to whether they have been purchased using a government benefit scheme or out-of-pocket with cash. All items inventory view 400 includes for each of several items a selected item column 402, which lists the item under consideration. Category and subcategory column 404 lists the WIC eligibility category of the selected item or its ineligible status. Base price column 406 provides a base or 'shelf price' for the selected item without government benefits, but including any applicable loyalty discounts or coupons, as well as a unit of measure and quantity.

WIC cost column 408, for WIC eligible items, lists the price after any applicable WIC discount. Out-of-pocket (OOP) cost item column 410, for items that are WIC ineligible or that the user has selected to purchase without using government benefits, lists the cost that a user will pay out of pocket. A user can choose to purchase a WIC eligible item without WIC benefits by touching a WIC removal button 412, which provides a user with the option to claim or refuse to claim a benefit with respect to an individual item, or can choose to transfer an item purchased out-of-pocket back to a WIC purchase by actuating WIC reinstatement button 414. The presence of the WIC removal button 412 and WIC reinstatement button 414 allows a user to eliminate transactions for which he lacks appropriate cash or benefits without the embarrassment of having to do so at the end of a transaction.

Where a more favorable price (with or without benefits) on a similar WIC category items is available, better price button 416 is made available in all items inventory view 400. All items inventory view 400 additionally includes a totals line 418 with a total for WIC cost column 408 and a total for out-of-pocket cost column 410 for the inventory of items purchased.

Figure 5:
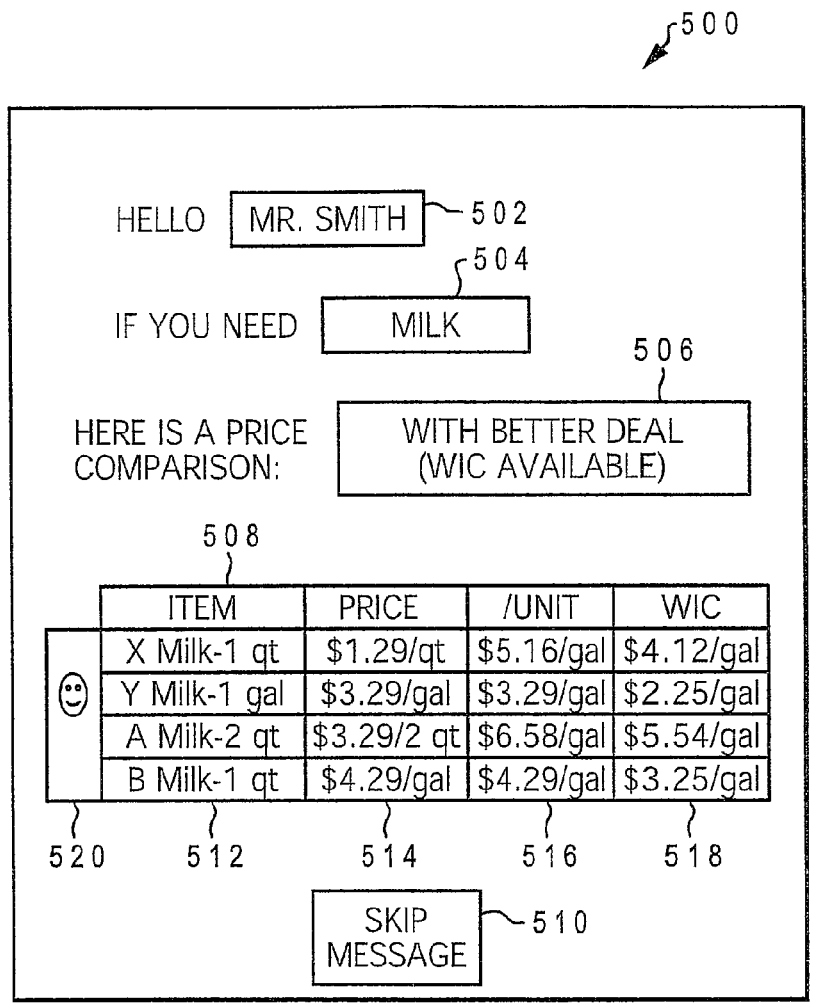
FIG. 5 depicts an exemplary Graphical User Interface (GUI) on the wireless device offering a price comparison based on available benefits to the shopper.

Referring now to FIG. 5, an exemplary Graphical User Interface (GUI) on the wireless device offering a price comparison based on benefits available to the shopper is depicted. The depicted graphical user interface includes a price comparison view 500, which would be activated by actuating better price button 416. Price comparison view 500 is a means for providing behavior modification instructions to a user.

Price comparison view 500 includes an address line 502 for identifying a user, an item line 504 for identifying the item subject to price comparison, a notice line 506 for informing the user that a lower effective price is available through the WIC program on the same item or a comparable item, a price comparison box 508 for comparing the various prices available and a skip message box 510. Alternatively, notice line 506 could be used to provide a nutritional comparison or instruction message. Within price comparison box 508, several different items of a particular category are listed.

For the example shown with respect to FIG. 5, the item subject to price comparison is milk. Items that will be listed in price comparison box 508 will be milk or comparable items (such as soy milk). For each item that is listed in the price comparison, an item description column 512, which provides the identity of the listed item, is displayed. Similarly price column 514, displays a base of an item price before application of benefits. Per unit price column 516, which displays a price per unit, and a benefits applied price column 518, which displays a price per unit after application of WIC benefits are displayed. Additionally, a best price indicator 520 is displayed for demonstrating to the user what the best available pricing is.

Turning now to FIG. 6, an exemplary Graphical User Interface (GUI) on a wireless device offering an inventory of benefits available to the shopper is displayed. Currently available benefits view 600 illustrates the benefits available to a user storewide. For each available item, an item description 602 identifies the item on which benefits are available. A category, subcategory and benefits expiration date column 604 provides the WIC categorization of the item and the expiration date for the available benefit. A unit of measure, quantity and cost column 606 is displayed, with relevant quantitative data. For items that are subject to competitive pricing, a better price button 416 is also displayed.

Referring now to FIG. 7, an exemplary Graphical User Interface (GUI) on the wireless device for tracking an inventory of benefits currently being used by the shopper is displayed. The WIC items inventory view 700, contains an item description column 702 for each item, which includes identification data for the item. Category and subcategory column 704 provides WIC classification data, and a unit quantity of measure and cost column 706 provides the relevant quantitative data. Better price button 416 is also displayed for items subject to price comparison.

Figure 8:
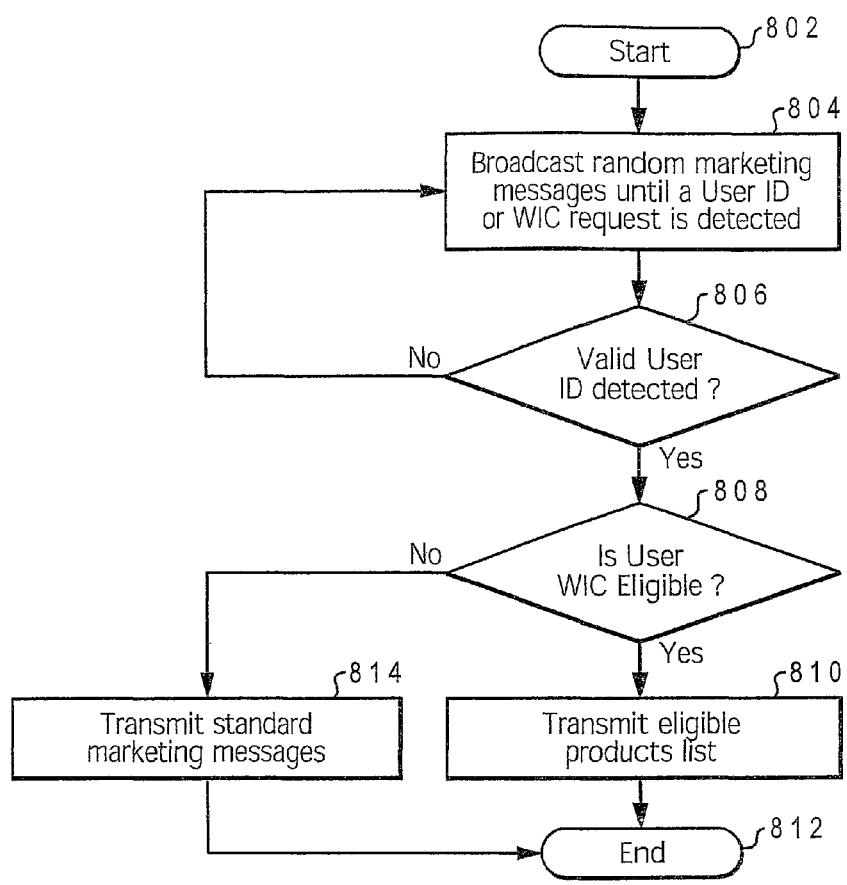
FIG. 8 is a flow chart of steps taken in a preferred embodiment of the present invention to transmitted information on available benefits to a wireless unit.

With reference now to FIG. 8, a flow chart of steps taken in a preferred embodiment of the present invention to transmit information on available benefits to a wireless unit is depicted. The process starts at step 802, which will typically correspond to activation of short range transmitter/receiver 122. The process then moves to step 804, which depicts short range transmitter/receiver 122 broadcasting random marketing messages until a user ID or WIC ID request is detected. The process then moves to step 806, which illustrates server 124 determining if a valid user ID is detected. If a valid user ID is not detected, then the process returns to step 804, which is described above.

If server 124 determines that a valid user ID is detected, then the process next moves to step 808. At step 808, server 124 determines if the user ID detected at step 806 is WIC eligible. If, at step 808, server 124 determines that the user ID detected in 806 is WIC eligible, then the process next moves to step 810. At step 810, short range transmitter/receiver receives an eligible products list from server 124 containing marketing messages regarding products and benefits available to the user ID detected in step 806, and those marketing messages are stored on short range transmitter/receiver 122 and transmitted to personal shopping device 202. The process then ends at step 812.

Returning to step 808, if it is determined that the user is not WIC eligible, then the process next moves to step 814, which depicts short range transmitter/receiver 122, sending standard marketing messages, not containing benefit information to personal shopping device 202 and conducting a normal shopping session, the process then ends at step 812.

Figure 9:
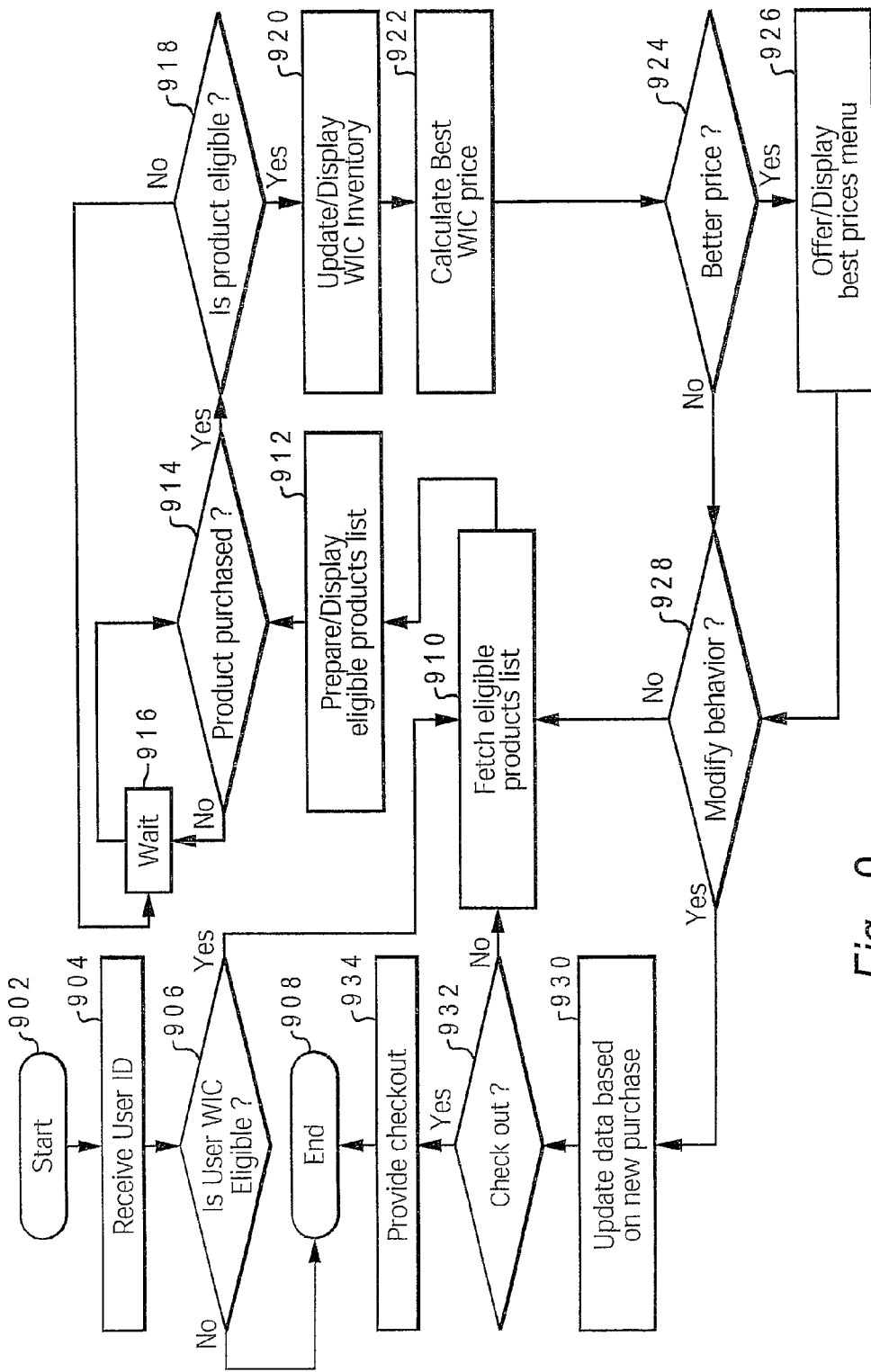
FIG. 9 is a flow chart of steps taken in a preferred embodiment of the present invention to provide government benefits and behavior modification during a shopping session.

Turning now to FIG. 9, a flow chart of steps taken in a preferred embodiment of the present invention to provide government benefits and behavior modification during a shopping session is illustrated. The process starts at step 902, which will typically correspond to activation of a personal shopping device. The process next moves to step 904, which depicts personal shopping device 202, receiving a user ID through input device 118. A user ID can be received by input device 118, either by scanning a card through bar code reader/magnetic card/smartcard reader module 202, or through tactile input through a keyboard device, or through other methods, such as an RFID card.

The process next moves to step 906, which depicts personal shopping device 202 determining if a user is WIC eligible. If personal shopping device 202 determines that a user is not WIC eligible, then the process ends at step 908. The end of the process at step 908 will typically lead to a user engaging in shopping through other processes not involving government benefits. If personal shopping device 202 determines that the user is WIC eligible, the process next moves to step 910. Step 910 illustrates personal shopping device utilizing short range wireless interface 120 to communicate with short range transmitter/receiver 122 and fetch an eligible products list. The process then moves to step 912, which depicts personal shopping device 202, preparing and displaying an eligible products list, such as current available benefits view 600.

The process next proceeds to step 914. At step 914, personal shopping device 202 determines whether a product has been purchased. If a product has not been purchased, then the process next proceeds to step 916, which depicts personal shopping device 202 entering a waiting state. The process then returns to step 914. If, by contrast, if personal shopping device 202 determines that a product has been purchased at step 914, the process next proceeds to step 918, which depicts personal shopping device 202 determining if the product purchased at step 914 is WIC eligible. If the selected product is not WIC-eligible, the process returns to step 916. If the selected product is WIC-eligible, the process next moves to step 920, which depicts personal shopping device 202 updating and displaying WIC items inventory view 700, which is one form of an inventory of benefit items. The process then moves to step 922. At step 922, personal shopping device 202 calculates the best available WIC price.

The process next proceeds to step 924, which depicts personal shopping device 924 determining if a lower effective price is available. If no better price is available, then the process moves to step 928, which is discussed below. If a better price is available, then the process moves to step 926. At step 926, personal shopping device 202 offers and possibly displays a best prices menu, which can take the form of displaying a better price button 416 in WIC items inventory view 700, current available benefits view 600, or all items inventory view 400 and waiting for a user to then actuate better price button 416 to display price comparison view 500. Alternatively, price comparison view 500 may be displayed directly without resorting to any of WIC items inventory view 700, current available benefits view 600, or all items inventory view 400.

The process then moves to step 928, which depicts personal shopping device 202 determining whether the user intends to modify behavior by reading response to best price view 500. If no behavior modification is indicated, the process next moves to step 910 which is described above. If behavior modification is indicated, then the process next moves to step 930, which depicts personal shopping device 202 updating its data based on new purchase. The process then moves to step 932, which depicts personal shopping device determining whether the user is ready to checkout. If the user is not ready to checkout, then the process returns to step 910, which is described above. If the user is ready to checkout, then the process moves to step 934. At step 934, personal shopping device 202 provides checkout services. The process then ends at step 908.

Figure 10B:
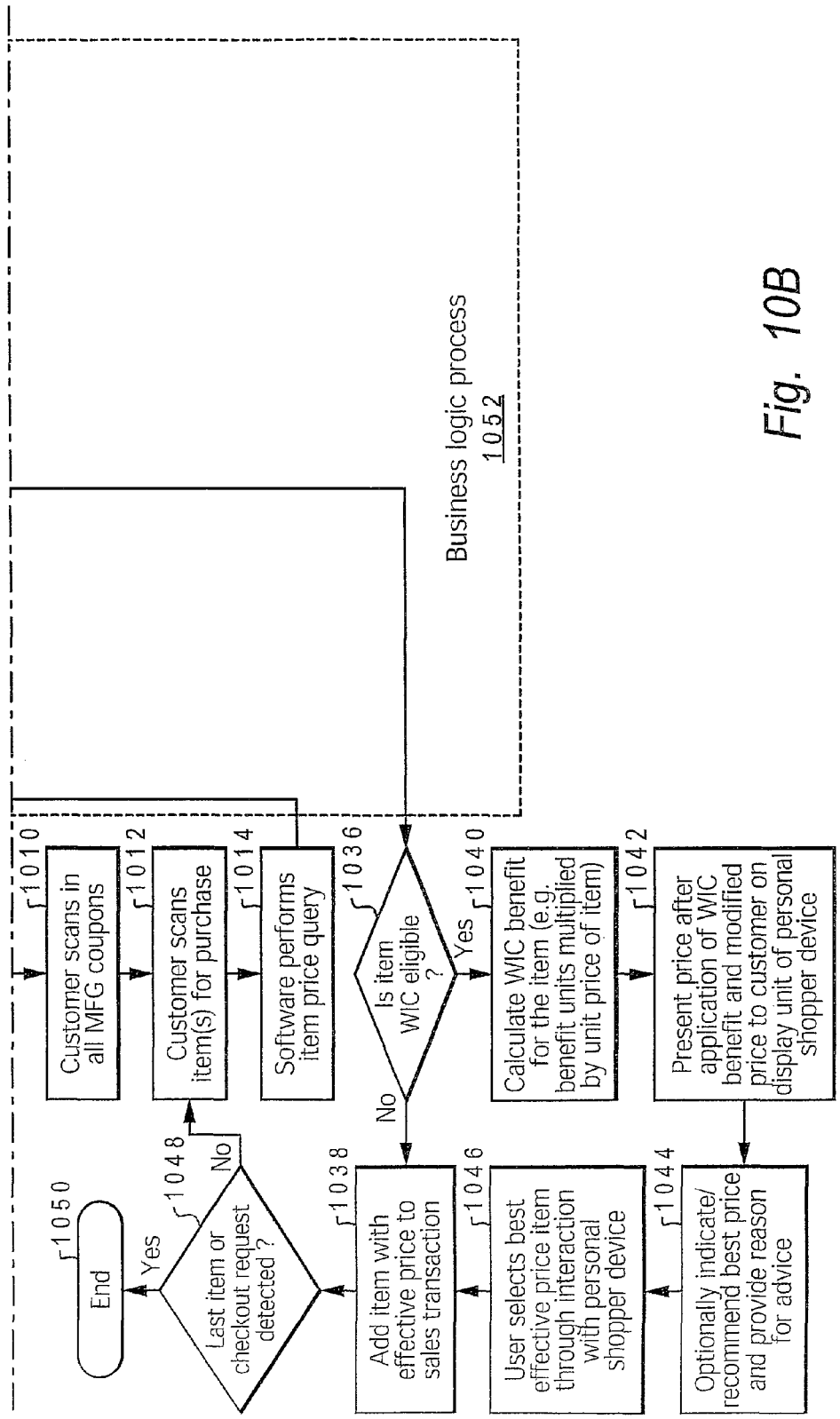
FIG. 10 is a flow chart of steps taken in a preferred embodiment of the present invention to provide government benefits using a best-price function during a shopping session.

Referring now to FIG. 10, a flow chart of steps taken in a preferred embodiment of the present invention to provide government benefits using a best-price function during a shopping session is depicted. The process starts at step 1000. The process then moves to step 1002. At step 1002, a customer signs on to a personal shopping device 202. The process then moves to step 1004, which depicts a customer scanning a discount card or loyalty card through bar code reader/magnetic card/smartcard reader module 208. The process next proceeds to step 1006, which depicts a customer entering a WIC ID through an input device 118 such as bar code reader/magnetic card/smartcard reader module 208. The process then moves to step 1008. At step 1008, customer WIC benefit data is transferred to personal shopping device 202 from server 124 through short range transmitter 122. The process next moves to step 1010, at which a customer scans in all manufacture coupons.

The process next proceeds to step 1012, at which a customer scans an item for purchase, and then proceeds to step 1014. At step 1014, personal shopping device 202 performs an item price query. The process then moves to step 1016, which begins business logic process 1052, containing steps 1016-1034. Step 1016 depicts personal shopping device determining if the purchased item is covered under a store promotion or loyalty card program. If the product is not covered under a store promotion or a loyalty card program, then the process moves to step 1018, which depicts personal shopping device 202 determining if the product matches a manufacturer coupon. If the selected product does not match a manufacturer coupon, then the process moves to step 1022. Step 1022 depicts personal shopping device 202 applying any remaining store discounts.

Returning to step 1016, if the item purchased is subject to a store promotion or loyalty card then the process next moves to step 1026, which depicts personal shopping device reducing the base price of the selected item by a discount amount. The process next moves to step 1028. At step 1028, personal shopping device 202 applies a store coupon for the difference between the original price and the discount price. The process then returns to step 1018. At step 1018, as described above, personal shopping device 202 determines whether a manufacturer coupon matches the selected item. If a manufacturer coupon matches the selected item, then the process moves to step 1030. At step 1030, personal shopping device reduces the modified item price by the coupon amount. The process then moves to step 1020. At step 1020, personal shopping device 202 determines if the coupon is configured for multiplication. If the coupon is configured for multiplication, then the process moves to step 1032. At step 1032, personal shopping device 202 applies an applicable multiple factor such as double coupons or triple coupons. The process then moves to step 1034. At step 1034, the personal shopping device 202 reduces the price by any applicable amount of discounts. The process then moves to step 1022, which is described above.

After step 1022, the process then moves to step 1036, which depicts personal shopping device 202 determining if the item is WIC eligible. If the item is not WIC eligible, then the process moves to step 1038 which depicts personal shopping device 202 adding the item, with its effective price, to a sales transaction. The process then moves to step 1048. At step 1048, the personal shopping device 202 determines whether a last item or checkout has been detected. If a last item or checkout has not been detected, then the process moves to step 1050, which depicts performing checkout service. The process then ends at step 1052. If a last item or checkout has not been detected, then the process returns to step 1012, which is described above.

Returning to step 1036, if an item is WIC eligible, then the process moves to step 1040. At step 1040, a WIC benefit is calculated by personal shopping device for the item. The process then moves to step 1042. At step 1042, personal shopping device presents the price after application of the WIC benefit and the modified price from business process logic 1052 to the customer in price comparison view 500 on display 106 of personal shopping device 202. The process next moves to step 1044, which depicts price comparison view 500 optionally indicating a recommended price or best price and providing a reason for that advice. The process next moves to step 1046, at which user selects the item with the best effective price from price comparison view 500 through interaction with personal shopping device 202. The process then moves to step 1038, which is described above.

Figure 11B:
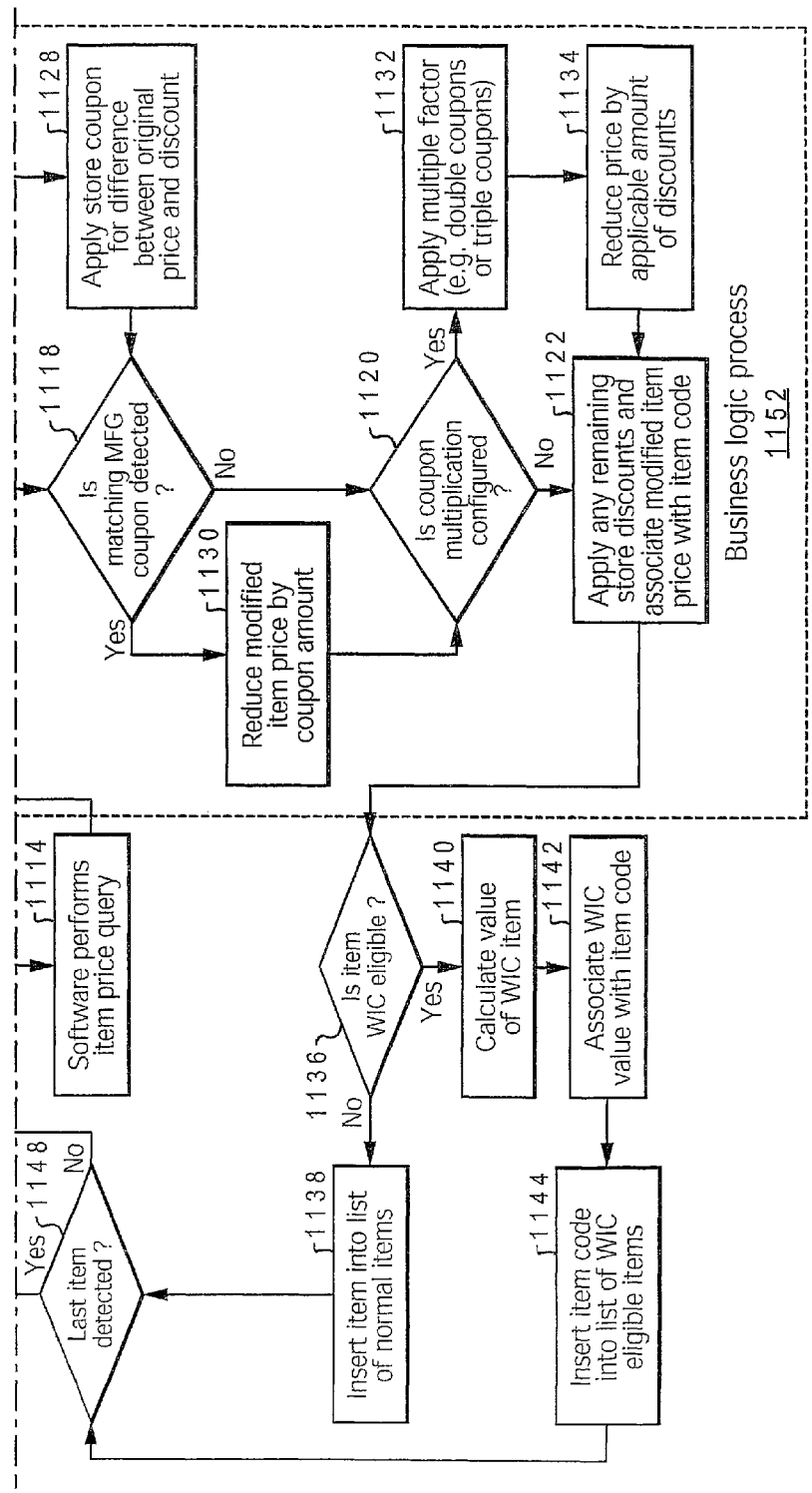
FIG. 11 is a flow chart of steps taken in a preferred embodiment of the present invention to provide government benefits using an out-of-pocket cost function during a shopping session.

FIG. 11 is a flow chart of steps taken in a preferred embodiment of the present invention to provide government benefits using an out-of-pocket cost function during a shopping session. The process starts at step 1100. The process then moves to step 1102. At step 1102, a customer signs on to a personal shopping device 202. The process then moves to step 1104, which depicts a customer scanning a discount card or loyalty card through bar code reader/magnetic card/smartcard reader module 208. The process next proceeds to step 1106, which depicts a customer entering a WIC ID through an input device 118 such as bar code reader/magnetic card/smartcard reader module 208. The process then moves to step 1108. At step 1108, customer WIC benefit data is transferred to personal shopper device 202 from server 124 through short range transmitter 122. The process next moves to step 1110, at which a customer scans in all manufacture coupons.

The process next proceeds to step 1112, at which a customer scans an item for purchase, and then proceeds to step 1114. At step 1114, personal shopping device 202 performs an item price query. The process then moves to step 1116, which begins business logic process 1152, containing steps 1116-1134. Step 1116 depicts personal shopping device 202 determining if the purchased item is covered under a store promotion or loyalty card program. If the product is not covered under a store promotion or a loyalty card program, then the process moves to step 1118, which depicts personal shopping device 202 determining if the product matches a manufacturer coupon. If the product does not match manufacturer coupon, then the process moves to step 1122. Step 1122 depicts personal shopping device 202 applying any remaining store discounts.

Returning to step 1116, if the item purchased is subject to a store promotion or loyalty card, then the process next moves to step 1126, which depicts personal shopping device 202 reducing the base price of the selected item by a discount amount. The process next moves to step 1128. At step 1128, personal shopping device 202 applies a store coupon for the difference between the original price and the discount price. The process then returns to step 1118. At step 1118, as described above, personal shopping device 202 determines whether a manufacturer coupon matches the selected item. If a manufacturer coupon matches the selected item, then the process moves to step 1130. At step 1130, personal shopping device reduces the modified item price by the coupon amount.

The process then moves to step 1120, which depicts personal shopping device 202 determining if the coupon is configured for multiplication. If the coupon is configured for multiplication, then the process moves to step 1132. At step 1132, personal shopping device 202 applies an applicable multiple factor such as double coupons or triple coupons. The process then moves to step 1134. At step 1134, personal shopping device 202 reduces the price by any applicable amount of discounts. The process then moves to step 1122, which is described above.

After step 1122, the process then moves to step 1136, which depicts personal shopping device 202 determining if the item is WIC eligible. If the item is not WIC eligible, then the process moves to step 1138, which depicts the personal shopping device adding the items to a normal (non-WIC) items list. The process then moves to step 1148. At step 1148, if the personal shopping device 202 determines that a last item or checkout has not been detected, then the process moves to step 1146, which is described below.

Returning to step 1136, if an item is WIC eligible, then the process moves to step 1140. At step 1140, the value of a WIC benefit is calculated by personal shopping device 202 for the selected item. The process then moves to step 1142. At step 1142, personal shopping device 202 associates the WIC value of the item with the item code. The process next moves to step 1144, which depicts personal shopping device 1144 inserting the item code into a list of WIC-eligible items, such as WIC Items inventory view 700. The process next moves to step 1148. At step 1148, if the personal shopping device 202 determines that a last item or checkout has been detected, then the process moves to step 1146.

At step 1146, personal shopping device 202 displays a list of WIC and non-WIC items with subtotals for each list, such as all-items inventory view 400. The process then moves to step 1150, which illustrates personal shopping device 202 determining whether user has moved a 'normal' (non-WIC) item to the WIC items list, such as by actuating reinstatement button 414 to move an item to WIC cost column 408. If an item has been moved to a 'normal' (non-WIC) item list, then the process moves to step 1154, which depicts personal shopping device 202 recalculating and displaying totals for both lists. The process then returns to step 1150.

At step 1150, if an item has not been moved to a 'normal' (non-WIC) item list, then the process moves to step 1156. At step 1156, personal shopping device 202 determines whether a WIC item has been moved to the 'normal' (non-WIC) items list, such as by actuating removal button 412 to move an item to out-of-pocket (OOP) cost item column 410. If a WIC item has been moved to the 'normal' (non-WIC) items list, then the process moves to step 1154, which is described above. If a WIC item has not been moved to the 'normal' (non-WIC) items list, then the process moves to step 1158. At step 1158, personal shopping device 202 asks a user to approve his total out of pocket expense. If the user does not approve his out of pocket expense, then the process returns to step 1146. If the user does approve his out of pocket expense, then the process next proceeds to step 1160, which illustrates personal shopping device 202 proceeding to payment. The process then ends at step 1162.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A system comprising:
a short-range transmitter in a predetermined product area in a store;
a storage device that stores one or more marketing messages in the short-range transmitter, wherein the one or more marketing messages are associated with one or more specific products located in the predetermined product area;
a transmitting device that transmits the one or more marketing message; and
a wireless computer that receives the one or more marketing messages, the wireless computer comprising:
a card reader that identifies a user as a participant in a government benefits scheme;
a display device that communicates benefits available under a subsidy program to a user;
a processor in communication with the card reader and display device; and
a utility that executes on the processor to display on the display device an analysis of benefits by performing functions of:
displaying to the user at least a portion of a subsidized list and an out-of-pocket list; displaying to the user an option to claim or refuse to claim a benefit with respect to each individual product of more than one product in the subsidized list; and
in response to receiving a first user input to refuse to claim the benefit for a selected individual product, moving the selected individual product from the subsidized list to the out-of-pocket list and displaying the selected individual product within the out-of-pocket list and displaying another unselected individual product in the subsidized list.

2. The system of claim 1, wherein said graphical interface for displaying an analysis of benefits available to a user further comprises graphical interface constructs for ascertaining the value of a government benefit to the user.

3. The system of claim 1, wherein said graphical interface for displaying an analysis of benefits available further comprises graphical interface constructs for informing a user of the out-of-pocket cost of an item with a government benefit and the out-of-pocket cost of an item without a government benefit.

4. The system of claim 1, further comprising graphical interface for displaying behavior modification instructions to a user.

5. The system of claim 4, wherein said graphical interface for displaying behavior modification instructions to a user further comprises said graphical interface for displaying nutrition instructions to a user.

6. A computer program product comprising: a computer-readable storage device; instructions on the computer-readable storage device that when executed by a processor of a data processing system causes the data processing system to perform functions of:
positioning a short-range transmitter in a predetermined product area in a store;
storing one or more marketing messages in the short-range transmitter, wherein the one or more marketing messages are associated with one or more specific products located in the predetermined product area;
transmitting the one or more marketing messages to a wireless computer;
identifying a user as a participant in a government benefits scheme;
communicating benefits available under a subsidy program to a user;
displaying on the display device an analysis of benefits by:
displaying to user at least a portion of a subsidized list and an out-of-pocket list;
displaying to the user an option to claim or refuse to claim a benefit with respect to each individual product of more than one product in the subsidized list; and
in response to receiving a first user input to refuse to claim the benefit for a selected individual product, moving the selected individual product from the subsidized list to the out-of-pocket list and displaying to the user the selected individual product within the out-of-pocket list and displaying another unselected individual product in the subsidized list.

7. The computer program product of claim 6, wherein said instructions for displaying an analysis of benefits available to a user further comprises instructions on the computer-readable storage device for ascertaining the value of a government benefit to the user.

8. The computer program product of claim 6, wherein said instructions for displaying an analysis of benefits available further comprises instructions on the computer-readable storage device for informing a user of the out-of-pocket cost of an item with a government benefit and the out-of-pocket cost of an item without a government benefit.

9. The computer program product of claim 6, further comprising instructions on the computer-readable storage device for displaying behavior modification instructions to a user.

10. The computer program product of claim 9, wherein the instructions for displaying behavior modification instructions to a user further comprises instructions on the computer-readable storage device for displaying nutrition instructions to a user.

11. The system of claim 1, wherein the analysis of benefits available includes separate pricing or discounts based on the manufacturer of the product.

12. The system of claim 1, wherein the effective price is a lowest sale price available per unit, wherein a unit is one of: a dose, a quantity, a serving, a weight, or a package of product.

13. The computer program product of claim 6, wherein the analysis of benefits available includes separate pricing or discounts based on the manufacturer of the product.

14. The computer program product of claim 6, wherein the effective price is a lowest sale price available per unit, wherein a unit is one of: a dose, a quantity, a serving, a weight, or a package of product.

15. The system of claim 1, wherein said graphical interface further displays an analysis of benefits available by displaying to the user the selected individual product moved from the out-of-pocket list to the subsidized list, in response to receiving a second user input to reinstate claim of the benefit for the selected individual product.

16. The system of claim 15, wherein said utility further executes on the processor to communicate benefits available under a subsidy program to the user by:
subtotaling an out-of-pocket cost of the out-of-pocket list for which a benefit is not available or individually refused by a user input;

subtotaling a subsidized cost of the subsidized list of individual products for which a benefit is available and claimed; and updating subtotals for the out-of-pocket cost and for the subsidized cost subsequent to moving the selected individual product from the out-of-pocket list to the subsidized list or from subsidized list to the out-of-pocket list.

17. The computer program product of claim 6, wherein said instructions for displaying the analysis of benefits available to a user further comprises instructions for displaying to the user the selected individual product moved from the out-of-pocket list to the subsidized list, in response to a determination of receiving a second user input to reinstate claim of the benefit for the selected individual product.

18. The computer program product of claim 17, wherein said instructions for communicating benefits available under a subsidy program to the user further comprises instructions for:

subtotaling an out-of-pocket cost of the out-of-pocket list of individual products for which a benefit is not available or individually refused by a user input;

subtotaling a subsidized cost of the subsidized list of individual products for which a benefit is available and claimed; and updating subtotals for out-of-pocket cost and for subsidized cost subsequent to moving a selected individual product from the out-of-pocket list to the subsidized list or from subsidized list to the out-of-pocket list.

* * * * *